United States Patent [19]
Shigetoh

[11] Patent Number: 5,088,735
[45] Date of Patent: Feb. 18, 1992

[54] SHAFT STRUCTURE OF GOLF CLUB AND PRODUCTION METHOD OF THE SHAFT

[75] Inventor: Hidetoshi Shigetoh, Fuchu, Japan

[73] Assignee: Ryobi Limited, Japan

[21] Appl. No.: 678,186

[22] Filed: Mar. 29, 1991

Related U.S. Application Data

[63] Continuation of Ser. No. 402,527, Sep. 5, 1989, abandoned.

[30] Foreign Application Priority Data

Sep. 5, 1988 [JP] Japan ................. 63-223306

[51] Int. Cl.⁵ ............................................. A63B 53/10
[52] U.S. Cl. .................... 273/80 B; 273/DIG. 23; 273/DIG. 7; 428/36.3; 428/257
[58] Field of Search ............... 273/80 R, 80 B, 73 F, 273/DIG. 7, DIG. 23; 428/246, 257, 258, 259, 268, 377, 36.3; 138/DIG. 2; 43/18.1

[56] References Cited

U.S. PATENT DOCUMENTS

| | | | |
|---|---|---|---|
| 2,573,361 | 10/1951 | Rodgers et al. | 273/80 R |
| 2,742,931 | 4/1956 | Ganahl | 273/DIG. 7 X |
| 2,809,144 | 10/1957 | Grimes | 273/80 B |
| 2,934,345 | 4/1960 | Scott | 273/DIG. 7 X |
| 3,969,557 | 7/1976 | Jenks | 273/DIG. 7 X |
| 3,998,458 | 12/1976 | Inoue et al. | 273/80 R |
| 4,000,896 | 1/1977 | Lauraitis | 273/80 R |
| 4,043,074 | 8/1977 | Airhart | 273/DIG. 23 X |
| 4,082,277 | 4/1978 | Van Auken | 273/80 R |
| 4,135,035 | 1/1979 | Branen et al. | 273/80 B X |
| 4,172,175 | 10/1979 | Pearson et al. | 273/DIG. 7 X |
| 4,591,155 | 5/1986 | Adachi | 273/DIG. 7 X |

FOREIGN PATENT DOCUMENTS

| | | | |
|---|---|---|---|
| 732501 | 4/1966 | Canada | 273/80 B |
| 51-37733 | 3/1976 | Japan | 273/80 R |
| 52-42098 | 10/1977 | Japan | 273/80 R |
| 62-164482 | 7/1987 | Japan | 273/80 B |
| 1261541 | 1/1972 | United Kingdom | 273/80 R |
| 2103667 | 2/1983 | United Kingdom | 273/DIG. 23 |

Primary Examiner—William H. Grieb
Assistant Examiner—Sebastiano Passaniti
Attorney, Agent, or Firm—Oliff & Berridge

[57] ABSTRACT

A golf club shaft is produced by winding a plurality of material layers around a mandrel which is finally removed. The layers include an inner layer, an intermediate layer and an outer layer. The inner layer is formed of a cloth prepreg which is cut out so that its fibers have angles of about ±45°. The cloth prepreg is wound around the mandrel. The inner layer may be formed of sheets formed of fibers which extend in a single orientation and have a high strength and a high modulus. The sheets are cut out with angles of ±30° to ±45°. The intermediate layer is formed of a uni-directional sheet formed of fibers extending in a single orientation, the intermediate layer being wound around an outer periphery of the inner layer. The outer layer is wound around an outer periphery of the intermediate layer, the outer layer being formed of a cloth tape prepreg prepared by a cloth tape formed by weaving warps formed of graphite yarns with other material yarns and of wefts formed of graphite yarns, the cloth tape prepreg being wound around the outer periphery of the intermediate layer with an angle of 70° at a butt of the mandrel, an angle of 45° at a tip thereof and decreasing angles at an intermediate portion between the butt and the tip.

17 Claims, 1 Drawing Sheet

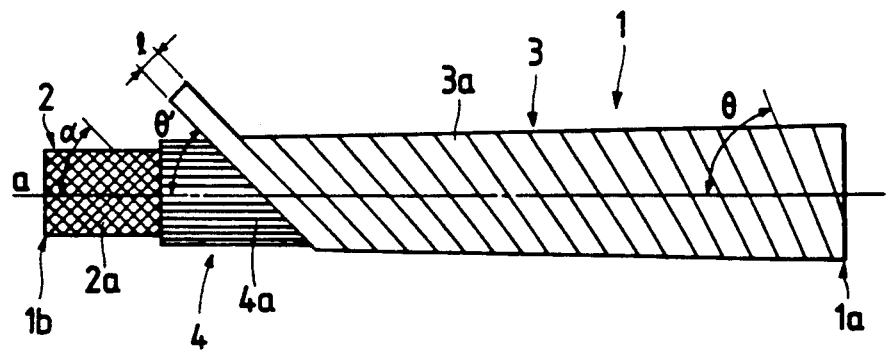
FIG. 1
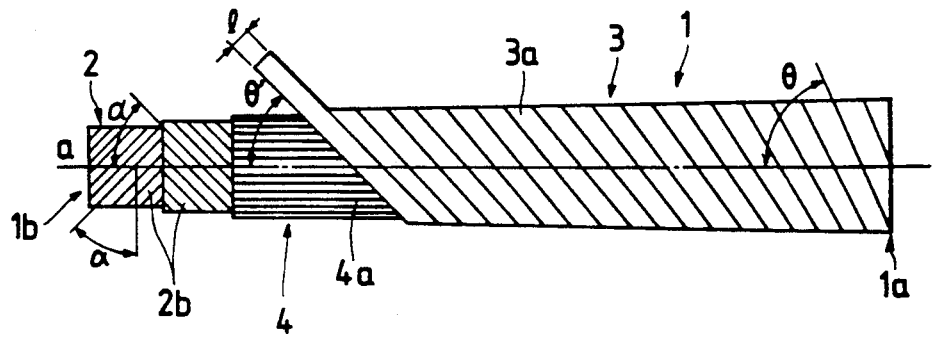
FIG. 2
FIG. 3
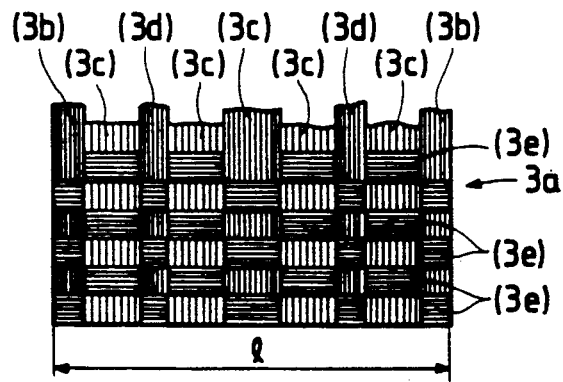
FIG. 4
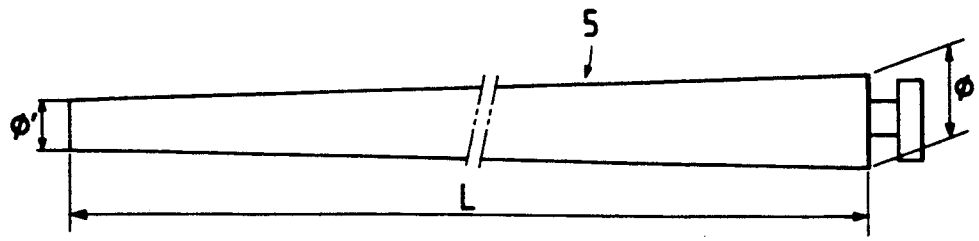

SHAFT STRUCTURE OF GOLF CLUB AND PRODUCTION METHOD OF THE SHAFT

This is a continuation of application Ser. No. 07/402,527 filed Sept. 5, 1989, now abandoned.

BACKGROUND OF THE INVENTION

This invention relates to a shaft structure of a golf club and a method of producing the shaft and, more particularly, a fiber reinforced plastic golf club shaft and its producing method.

In these days, there has been widely known a golf club shaft made of a carbon fiber reinforced plastic material which has a superior strength, a high elastic or modulus property and a light weight in comparison with a metallic golf club shaft. A golf ball can be sent with a long flying distance by striking the ball with a golf club shaft formed of a carbon fiber reinforced plastic material in comparison with the metallic golf club shaft, but the carbon fiber reinforced shaft is insufficient in torsion, so that the ball struck with the carbon fiber reinforced plastic golf club shaft may fly in a direction different from that desired and it is also difficult to impart a spin to the ball by striking the ball with the carbon fiber reinforced plastic golf club.

Furthermore, recently, there has been also widely known a golf club having a shaft formed by winding different kinds of fibers such as carbon or graphite fibers, amorphous metallic tapes or metallic fibers in multiple layers to improve the torsional rigidity and the flexural rigidity of the shaft of the golf club.

However, in the conventional shafts of the golf clubs of the type in which the amorphous material or metallic material other than the carbon or graphite material is solely wound as an outer layer for the golf club shaft, the outer layer is liably easily peeled by the impact or torsion applied to the golf club shaft when the golf club strikes a golf ball. For this reason, the layer made of the amorphous material or the metallic fiber is only wound as an inner layer for the golf club shaft. In an example in which the metallic fiber is wound as the inner layer, however, the location of the metallic fiber prevents the inner and outer layers from being tightly contacted or engaged with each other. In order to obviate this defect, it is possible to wind the metallic fiber around the golf club shaft in a spiral fashion or a twill fashion with suitable angles. However, the conventional golf club shaft is basically formed by the inner layer constructed as a $\theta°$-angled layer having an cutting angle of $\pm\theta$ (30° to 45°) and the outer layer constructed as 0°-angled layer with respect to the axial direction of the shaft. In order to improve torque, i.e., the torsional rigidity, of the golf club shaft, it is, however, known to be advantageous to construct the inner and outer layers as the $\theta°$-angled layers. In this view point, the conventional golf club shaft in which the outer layer is constructed as $\theta°$-angled layer is not provided with a desired torsional rigidity for the reason described above.

SUMMARY OF THE INVENTION

It is an object to substantially eliminate the defects or drawbacks encountered to the prior art described above and to provide a golf club shaft having an improved sructure having a high torsional rigidity and a flexural rigidity as well as a fine appearance and provide a method of producing the golf club shaft of the improved structure.

According to one aspect of this invention, there is provided a golf club shaft formed by winding an inner layer, an intermediate layer and an outer layer of material around a mandrel. The inner layer is formed of a cloth prepreg cut so that its fibers have angles of about + or −45° with respect to the axial direction of the shaft and wound around the mandrel. The intermediate layer is formed of a uni-directional prepreg sheet having high strength and high modulus fibers. The intermediate layer is wound around an outer periphery of the inner layer so that fibers of the prepreg sheet comprising the intermediate layer are extended in parallel with the axial direction of the mandrel. The outer layer is formed of a cloth tape prepreg by weaving warps formed of graphite yarns with other material yarns and wefts formed of graphite yarns. The outer layer is wound around an outer periphery of the intermediate layer so that the outer layer has a relatively large angle at a butt of the mandrel, decreasing angles at an intermediate portion between the butt and a tip, and an angle smaller than that at the butt at the tip thereof. Upon winding of the three layers, the mandrel can be removed.

In another aspect of this invention, there is provided a method for producing a golf club shaft by preparing a mandrel having some kinds of tapers along an axial length; winding a cloth prepreg woven of fibers in a cross shape with angles of about + or −45° around an outer periphery of the mandrel to form an inner layer; winding a uni-directional prepreg sheet formed of high strength and high modulus fibers extending in a single orientation around an outer periphery of the inner layer, the fibers being parallel with the axial direction of the mandrel to form an intermediate layer; winding a cloth tape prepreg around an outer periphery of the intermediate layer with a relatively large angle at a butt of the mandrel, decreasing angles at an intermediate portion between the butt and a tip, and an angle smaller than that at the butt at the tip thereof; and removing the mandrel from a layered structure composed of the inner layer, the intermediate layer and the outer layer. The outer layer is formed of a cloth tape prepared by weaving warps formed of graphite yarns with other material yarns and wefts formed of graphite yarns, impregnating a thermal setting resin such as an epoxy resin and semi-drying the thus impregnated cloth tape.

In modifications of both the above aspects, the inner layer is formed of two uni-directional prepreg sheets each formed of high strength and high modulus fibers extending in a single orientation, each sheet being cut out and piled up with its fibers disposed at an angle of ±30° to ±45°, the sheets being wound around the mandrel along the axial length thereof. The other material yarns of the warps of the outer layer are composed of metallic foils with a fine width such as titanium or amorphous and/or ceramic yarns and/or graphite plated yarns and/or organic fibers such as KEVLAR (trademark of Dupont Company). The wefts of the outer layer are woven at a rate of 3 to 7 numbers per centimeter, of the graphite fibers and the warps thereof have a pitch of 1 to 2 mm.

According to the golf club shaft of the characters described above, the inner and outer layers are formed with suitable angles with respect to the axial direction of the golf club shaft to be formed, so that the torsional rigidity can be remarkably improved. In addition, the intermediate layer is formed with $\theta°$-angle by a sheet having a single fiber orientation and the oufer layer of the cloth tape prepreg is wound in an inclined manner so as to increase the rigidity in the peripheral direction of the cloth tape prepreg, so that the flexural rigidity can also be improved.

The cloth tape prepreg is made of different kinds of yarns and is formed of a woven cloth with warps with a suitable pitch and wefts to prevent the outer layer from rising or peeling. Therefore, the cloth tape prepreg improves the impact proof property, the elastic or modulus property and the fitness thereof. In addition, the pitched arrangement of the different kinds of yarns gives a fine outer appearance.

BRIEF DESCRIPTION OF THE DRAWINGS

In the accompanying drawings:

FIG. 1 is a side view, partially broken away, of one embodiment of a golf club shaft according to this invention;

FIG. 2 is a side view, partially broken away, of another embodiment of a golf club shaft according to this invention;

FIG. 3 is an enlarged plan view of a portion of a cloth tape prepreg forming an outer layer of the golf club shaft shown in FIG. 1 or 2; and FIG. 4 is a side view of a mandrel used for producing the golf club shaft shown in FIG. 1 or 2.

DESCRIPTION OF THE PREFERRED EMBODIMENTS

Referring to FIGS. 1 and 2 showing the side view of the preferred embodiments of the golf club shafts according to this invention, a shaft 1 of a golf club is composed of an inner layer 2, an outer layer 3 and an intermediate layer 4 formed between the inner and outer layers 2 and 3. The shaft 1 is formed in a hollow tapered structure as a whole.

The inner layer 2 is formed of, as shown in FIG. 1, a cloth prepreg 2a formed by weaving the TORAYCA (Comercial Product Name of TORAY Industries, Inc.) M40J-6K into plain weave, satin weave or non-crimp weave with a woven dinsity of 4.5 yarns/25 mm in vertical and horizontal directions. The cloth prepreg 2a is cut out so that those fibers have an angle of 45° ($\alpha=45°$) with respect to the axial direction of the shaft 1. The cloth 2a is wound around a mandrel or a core member for constituting a golf club shaft 1. The layer 2 may also be formed of, as shown in FIG. 2, a plurality of uni-directional sheets 2b each of which is formed of fibers extending in a single orientation and then cut out with angles of ±30° to ±45°. Further, a sheet cut out with an angle of +30° to +45° is piled on a sheet cut out with an angle of −30° to −45° to form the layer 2. The thus prepared sheets 2b are wound around the mandrel generally of tapered configuration in the axial direction thereof forming a shaft 1 of the golf club with an angle $\alpha$ of fibers in the range of ±30° to ±45° with respect to the axis of the mandrel.

The intermediate layer 4 is formed with a 0°-angled layer prepared by a uni-directional prepreg sheet 4a whose fibers extend in a single orientation and have a high strength and high modulus property such as a material of TORAY 8052-15. The sheet 4a is arranged in parallel to the axis a of the shaft 1.

The outer layer 3 is composed of warps made of graphite yarns as a main element with which fine metallic foils made of titanium, amorphous or the like and/or ceramic yarns and/or graphite plated or evaporated yarns and/or organic fibers such as KEVLAR are properly mixed and of wefts made of 3 to 7 numbers per centimeter of graphite yarns of 1 k (1000 monofilaments of diameter of $7\mu$) or 0.5 k (500 monofilaments of diameter of $7\mu$). The warps have a pitch of 1 to 2 mm, and the warps and wefts are woven to form a cloth tape with a total width I of 15 to 20 mm. The thus prepared tape is impregnated by a thermosetting resin such as epoxy resin and then semi-dried to form a cloth tape prepreg 3a which is then wound around the outer periphery of the intermediate layer 4 through the total length of the shaft 1 in a spiral form so as to have an inclination, with respect to the axis of the shaft 1, of about 70° ($\theta$) at the butt 1a of the shaft 1 to be formed and of about 45° ($\theta'$) at the tip 1b thereof, the inclination being changed in a decreasing manner from 70° to 45° between the butt end 1a and the tip 1b of the shaft 1 while the cloth tape prepreg 3a is wound around the outer periphery of the intermediate layer. In modifications, the prepreg 3a is wound in a spiral form only in a predete region in a single direction or in a twill form in the reciprocated manner several times as occasion demands.

The golf club shaft of the character described above will be produced in accordance with the following manner.

The production method comprises the steps of forming an inner layer 2 by winding the cloth prepreg 2a or sheets 2b having a single fiber orientation around the mandrel for the golf club shaft 1, forming an intermediate layer 4 by winding the sheet 4a around the outer periphery of the inner layer 2 and forming the outer layer 3 by winding the cloth tape prepreg 3 around the outer periphery of the intermediate layer 4 with an inclination described hereinafter.

The manufacturing method will be described further in detail by way of a concrete embodiment.

(1) As shown in FIG. 4, the mandrel 5 used has a tip of a diameter $\phi'$ of 4.5 mm, a butt of a diameter $\phi$ of 12.47 mm and a longitudinal length L of 1163 mm. Release agent was applied to the surface of the mandrel 5.

(2) The inner layer 2 was formed of a cloth prepreg 2a prepared by impregnating, with an epoxy resin of 32 wt. %, a cloth of TORAYCA (Commercial Product Name of TORAY Industries, Inc.) M40J-6k which was woven in a plain weave at the woven density of 4.5 yarns/25 mm in vertical and horizontal directions and then semi-dried. The thus prepared prepreg 2a was cut out in a manner that the width of the cloth prepreg corresponds to four times length of circumference of the mandrel 5 to form four layers thereon.

(3) A sheet of TORAY 8052-15 was cut out in a manner that the width of the sheet corresponds to three times length of circumference of the inner layer 2 to form three layers thereon.

(4) The cloth tape prepreg 3a was manufactured, as shown in FIG. 3, by warps which were prepared by arranging a two numbers of the TORAYCA T 300-0.5K (3b), five numbers of the TORAYCA T 300-1K (3c), and two numbers of fine titanium foil tape having a size of $25\mu \times 0.6$ mm (3d) and by wefts which were prepared by arranging the TORAYCA T 300-0.5K (3e) of the woven plain weave density of 7 yarns/cm. The warps and the wefts are woven into a cloth tape and the thus woven cloth tape was impregnated with the epoxy resin of 32 wt. %. and then semi-dried.

The width 1 of the cloth tape prepreg 3a was set at 16 mm.

(5) The cloth prepreg 2a cut out with an angle of 45° was wound around the mandrel 5 with a load of about 800 kg and the sheet of TORAY 8052-15 was then wound around the outer periphery of the thus wound prepreg with a load of about 500 kg. The cloth tape prepreg 3a was then wound around the outer periphery of the TORAY 8052-15 with a pitch of 18 mm at the butt and a pitch of 22.5 mm at the tip. The cloth tape prepreg 3a was wound with the increasing pitch at a portion between the butt and the tip. In other words, the cloth tape prepreg 3a was wound with an angle of about 70° at the butt with respect to the axial direction of the shaft 1, with an angle of about 45° at the tip thereof, and with decreasing angles at a portion between the butt and the tip.

(6) A polypropylene tape, not shown, (thickness: 40μ; width: 15 mm) was wound around the outer periphery of the cloth tape prepreg 3a with a tension of 5 kg.

(7) The thus prepared material was hardened by heating for two hours in an oven at a temperature of about 130° C.

(8) The mandrel 5 was separated and the polypropylene tape as the outer layer was removed. The remainder was then cut out so as to have an axial length of 1143 mm.

(9) The outer surface of the thus cut material was then ground with a buff and then coated with an epoxy coat.

(10) According to the above described procedures, a golf club shaft having a tip (diameter $\phi$: 7.18 mm) and a butt (diameter $\phi$: 15.20 mm), the weight of 78 g, the flexibility of 150 mm, the torque of 2.8°, and the strength of 110 kg at the tip was obtained.

The flexibility was measured in the following manner.

First, the shaft was supported at a position of 92 cm from its tip. Then, a weight of 3 kg was suspended at a position of 10 cm from the tip. The distance through which the tip was lowered was the flexibility.

The torque was measured in the following manner.

The shaft was supported at a position of 98.5 cm from its tip. Then, a moment of 1 lb. ft was given at a position of 25 mm from the tip. The twisted angle was the torque.

The following Table 1 represents the comparison in characteristics of the golf club shaft 1 according to this invention with those of a reference golf club shaft which is not provided with the outer layer 3 of this invention. In the comparison, the titanium tape was utilized.

TABLE 1

|  | This invention | Reference |
| --- | --- | --- |
| Torque | 2.8° | 3° |
| Flexural Strength | 110 kg | 100 Kg |
| Weight | 78 g | 78 g |
| Appearance | Titanium tape in spiral form was clearly observed and remarkable characteristics appeared in an appearance. |  |
| Fatigue Proof Test | 1,000,000 | 800,000 |
| Impact Proof Test | Generation of cracks was reduced because of easy transfer of impact due to arrangement of cloth as outer layer |  |

As is apparent from the Table-1, according to this invention, the specific torque, the specific strength and the specific fatigue proof are improved by 7%, 10% and 25%, respectively. In addition, according to the golf club shaft according to this invention, the improved impact proof property can be attained and the outer appearance can be made fine.

According to the golf club shaft of the characters described hereinabove, the inner and outer layers 2 and 3 are formed with suitable angles with respect to the axial direction of the golf club shaft to be formed, so that the torsional rigidity can be remarkably improved. In addition, the intermediate layer 4 is formed with 0-angle layer of a uni-directional sheet having a single fiber orientation, so that the flexural rigidity can also be improved. Further, the outer layer of the cloth tape prepreg improves both torsional and flexural rigidities.

The cloth tape prepreg 3a of the outer lyer 3 is made of different yarns and is formed by a woven cloth with warps with suitable pitches and wefts to prevent the outer layer from rising or peeling. Therefore, the cloth tape prepreg improves the impact proof property, the elastic or modulus property and the fitness thereof. In addition, the pitched arrangement of the warps gives a fine outer appearance.

Further, according to the method of this invention, since the cloth tape prepreg 3a is wound while gradually changing angles with respect to the axial of the shaft 1 between the butt and the tip thereof, torque, flexural strength, fatigue limit and torsional rigidity are increased.

What is claimed is:

1. A golf club shaft formed by winding a plurality of material layers around a mandrel which is finally removed comprising:

an inner layer formed of a cloth prepreg cut out so that its fibers have a predetermined oblique angle with respect to an axial direction of the mandrel and wound around the mandrel;

an intermediate layer formed of a uni-directional prepreg sheet of high strength and high modulus fibers wound around an outer periphery of said inner layer in a state wherein fibers of the sheet are extended in parallel with the axial direction of the mandrel; and an outer layer wound around an outer periphery of said intermediate layer, said outer layer being formed of a cloth tape prepreg having generally parallel side edges with a predetermined width equal to or smaller than 20 mm by weaving warps formed of graphite yarns with other material yarns and wefts formed of graphite yarns, said cloth tape prepreg being wound around the intermediate layer with respect to the axial direction of the mandrel with an angle greater than 45° at a butt of the mandrel, an angle of about 45° at a tip thereof and decreasing angles along an intermediate portion between the butt and the tip.

2. A golf club shaft according to claim 1, wherein said cloth tape prepreg is wound around the intermediate layer with respect to the axial direction of the mandrel with an angle of 70° at the butt of the mandrel.

3. A golf club shaft according to claim 1, wherein said other material yarns of the warps of the outer layer consist of at least one of the group comprising metallic foils with a fine width, ceramic yarns, amorphous yarns, graphite plated yarns, and organic fibers.

4. A golf shaft according to claim 3, wherein said metallic foils with a fine width include titanium and said organic fibers include KEVLAR.

5. A golf club shaft according to claim 1, wherein said wefts are woven at a rate of 3 to 7 numbers per centimeter, of the graphite yarn having a size of 1 k or 0.5 k.

6. A golf club shaft according to claim 1, wherein said warps have a pitch of 1 to 2 mm.

7. A golf club shaft according to claim 1, wherein said cloth prepreg forming the inner layer is formed with plain weave, satin weave or non-crimp weave.

8. A golf club shaft according to claim 1, wherein said cloth tape prepreg is wound around the outer periphery of said intermediate layer in the form of a spiral fashion or twill fashion along a predetermined length thereof.

9. A golf shaft according to claim 1, wherein said cloth tape prepreg of the outer layer has a width less than 25 mm.

10. A golf club shaft formed by winding a plurality of material layers around a mandrel which is finally removed comprising:
   an inner layer formed of uni-directional prepreg sheets having high strength and high modulus fibers extending in a single orientation, said sheets being formed in a manner so that at least one uni-directional sheet whose fibers are disposed at an angle of +30° to +45° relative to an axial direction of the mandrel is piled on at least one uni-directional sheet whose fibers are disposed at an angle of −30° to −45° to the axial direction of the mandrel, said sheets being wound around the mandrel along an axial length thereof;
   an intermediate layer formed of a uni-directional sheet of high strength and high modulus fibers wound around an outer periphery of said inner layer in a state wherein fibers of the sheet are extended in parallel with the axial direction of the mandrel; and
   an outer layer wound around an outer periphery of said intermediate layer, said outer layer being formed of a cloth tape prepreg having generally parallel side edges with a predetermined width equal to or smaller than 20 mm by weaving warps formed of graphite yarns with other material yarns and wefts formed of graphite yarns, said cloth tape prepreg being wound around the intermediate layer with respect to the axial direction of the mandrel with an angle greater than 45° at a butt of the mandrel, an angle of about 45° at a tip thereof and decreasing angles along an intermediate portion between the butt and the tip.

11. A golf club shaft according to claim 10, wherein said cloth tape prepreg is wound around the intermediate layer with respect to the axial direction of the mandrel with an angle of 70° at a butt of the mandrel and an angle of 45° at a tip thereof.

12. A golf club shaft according to claim 10, wherein said other material yarns of the warps of the outer layer consist of at least one of the group comprising metallic foils with a fine width, ceramic yarns, amorphous yarns, graphite plated yarns, and organic fibers.

13. A golf shaft according to claim 12, wherein said metallic foils with a fine width include titanium and said organic fibers include KEVLAR.

14. A golf club shaft according to claim 10, wherein said wefts are woven at a rate of 3 to 7 numbers per centimeter, of the graphite yarn having a size of 1 k or 0.5 k.

15. A golf club shaft according to claim 10, wherein said warps have having a pitch of 1 to 2 mm.

16. A golf club shaft according to claim 10, wherein said cloth tape prepreg is wound around the outer periphery of said intermediate layer in the form of a spiral fashion or twill fashion along a predetermined length thereof.

17. A golf shaft according to claim 10, wherein said cloth tape prepreg of the outer layer has a width less than 25 mm.

* * * * *